United States Patent
Souers et al.

(10) Patent No.: US 10,895,310 B2
(45) Date of Patent: Jan. 19, 2021

(54) SIDE PLATE TO STATOR ATTACHMENT FOR TORQUE CONVERTER

(71) Applicant: SCHAEFFLER TECHNOLOGIES AG & CO. KG, Herzogenaurach (DE)

(72) Inventors: Long Souers, North Canton, OH (US); Drew Hilty, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 162 days.

(21) Appl. No.: 16/110,541

(22) Filed: Aug. 23, 2018

(65) Prior Publication Data

US 2020/0063843 A1 Feb. 27, 2020

(51) Int. Cl.
F16H 41/28 (2006.01)
F16H 45/02 (2006.01)
F16H 41/24 (2006.01)

(52) U.S. Cl.
CPC ....... *F16H 41/28* (2013.01); *F16H 2041/246* (2013.01); *F16H 2041/285* (2013.01)

(58) Field of Classification Search
CPC .... F16H 41/28; F16H 45/02; F16H 2041/245; F16H 2041/285
See application file for complete search history.

(56) References Cited

U.S. PATENT DOCUMENTS

| | | | |
|---|---|---|---|
| 3,518,026 A | 6/1970 | Iijima | |
| 4,733,979 A | 3/1988 | Tsuruki | |
| 5,489,255 A | 2/1996 | Hinckley et al. | |
| 5,918,987 A | 7/1999 | Sundquist et al. | |
| 6,036,373 A | 3/2000 | Faass et al. | |
| 6,044,946 A | 4/2000 | Makino et al. | |
| 6,205,779 B1 | 3/2001 | Botosan et al. | |
| 7,762,065 B2 * | 7/2010 | Ochi | F16H 41/24 60/341 |
| 8,162,612 B2 * | 4/2012 | Brees | B23K 1/0008 416/197 C |
| 8,186,492 B2 * | 5/2012 | Brees | F16D 41/185 192/46 |
| 2002/0153217 A1 | 10/2002 | Sato | |
| 2004/0211173 A1 | 10/2004 | Ono et al. | |
| 2007/0137977 A1 | 6/2007 | Peri et al. | |
| 2007/0224042 A1 * | 9/2007 | Brees | F04D 29/542 415/208.2 |

* cited by examiner

*Primary Examiner* — Tinh Dang
(74) *Attorney, Agent, or Firm* — Brooks Kushman P.C.

(57) ABSTRACT

A stator assembly of a torque converter includes a stator having circumferentially arranged blades, an inner ring, and projections circumferentially arranged around the inner ring and extending radially inward therefrom. An annular plate is circumscribed by the inner ring and has a plurality of attachment portions circumferentially arranged around an outer surface of the plate. Each of the attachment portions engages with an associated one of the projections and has a pair of spaced anti-rotation tabs that define a receptacle. The receptacle receives the associated one of the projections to prevent relative rotation between the stator and the plate.

20 Claims, 6 Drawing Sheets

SIDE PLATE TO STATOR ATTACHMENT FOR TORQUE CONVERTER

TECHNICAL FIELD

The present disclosure relates to stator assemblies for torque converters and more specifically to techniques for attaching an annular side plate to a stator.

BACKGROUND

Vehicles may include a torque converter for coupling a transmission input shaft to a crankshaft of an engine. The torque converter includes an impeller fixed to the crankshaft, a turbine fixed to the input shaft, and a stator disposed between the impeller and the turbine. Power is transferred between the impeller and the turbine by a fluid coupling. The stator redirects fluid returning from the turbine so that the fluid is rotating in the same direction as the impeller.

SUMMARY

According to one embodiment, a stator assembly of a torque converter includes a stator having circumferentially arranged blades, an inner ring, and projections circumferentially arranged around the inner ring and extending radially inward therefrom. An annular plate is circumscribed by the inner ring and has a plurality of attachment portions circumferentially arranged around an outer surface of the plate. Each of the attachment portions engages with an associated one of the projections and has a pair of spaced anti-rotation tabs that define a receptacle. The receptacle receives the associated one of the projections to prevent relative rotation between the stator and the plate.

According to another embodiment, a method of assembling a stator assembly of a torque converter includes fabricating an annular side plate including a plurality of attachment portions circumferentially arranged around an outer surface of the plate. Each of the attachment portions have a pair of spaced anti-rotation tabs. The method further includes inserting the plate into a stator, that includes a hub and blades circumferentially arranged around the hub, such that the hub circumscribes the plate. The method also includes staking the stator at each of the attachment portions such that material of the hub flows between the anti-rotation tabs to rotationally fix the stator and the plate.

According to yet another embodiment, a stator assembly of a torque converter includes a stator having an inner ring and circumferentially arranged blades. The annular plate has opposing faces, an outer circumferential surface extending between the faces, and teeth formed on the outer surface. The plate is disposed within the inner ring with the teeth penetrating into the inner ring to attach the plate to the stator.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
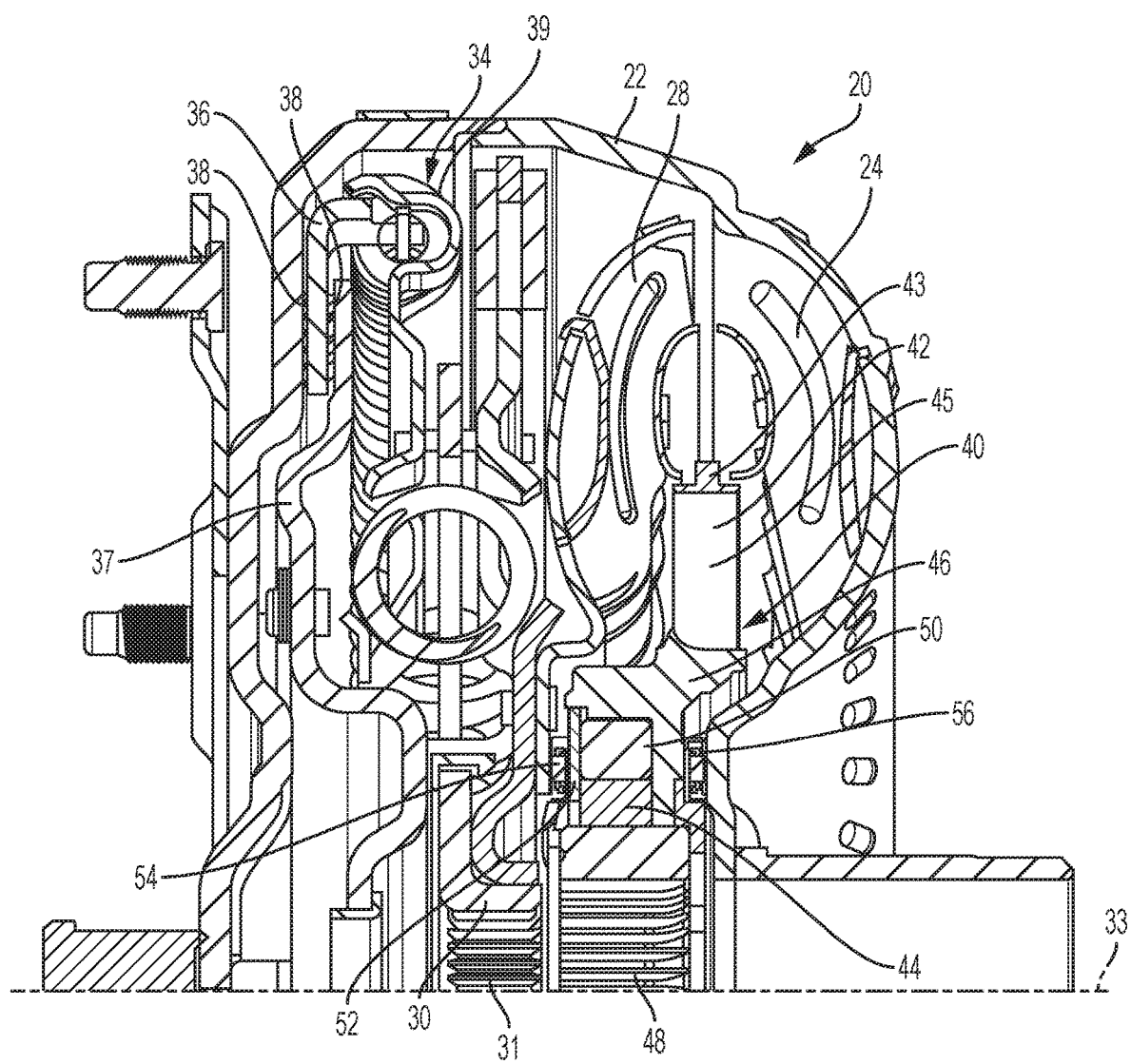
FIG. 1 is a cross-sectional side view of a torque converter.

Referring to FIG. 1, a torque converter 20 may be coupled between an engine and a transmission. The torque converter 20 includes a case 22 having an impeller 24 fixed thereto. The case 22 may be coupled to the engine by a flex plate or other type of bracketry. A turbine 28 is disposed in the case 22 adjacent to the impeller 24. The impeller 24 and the turbine 28 are configured to fluidly couple and transmit power from the impeller 24 to the turbine 28 when the impeller 24 rotates faster than the turbine 28. The turbine 28 may be attached to a damper flange 30. The damper flange 30 may couple to an input shaft of the transmission. For example, the damper flange 30 may include internal splines 31 that receive external splines of the input shaft.

The torque converter 20 may include a bypass clutch 34 configured to mechanically couple the damper flange 30 to the case 22 to bypass the fluid coupling between the impeller 24 and the turbine 28. The clutch 34 may include a clutch disk 36 and a driven disk 39 that are supported for rotation about an axial centerline 33 of the torque converter 20 and may be concentric with each other. The clutch disk 36 includes one or more friction surfaces 38. The illustrated clutch disk 36 includes a first friction surface that engages with the case 22 and a second friction surface that engages with the piston 37. When the clutch 34 is engaged, torque is transferred into the driven disk 39, which is operable coupled to the damper flange 30. Many types of bypass clutches are known, and this disclosure is not limited to the illustrated embodiment.

The torque converter also includes a stator assembly 40 having a stator 42 coupled to a stator shaft by a one-way clutch 44. The stator 42 may include an outer ring 43 and a plurality of blades 45 that are circumferentially arranged between a hub 46 and the outer ring 43. The stator assembly 40 is supported on a stator shaft (not shown) that is fixed to a front support of the transmission and is stationary relative to the torque converter 20. When the turbine shaft is stationary or rotating slowly compared to the crankshaft, the one-way clutch 44 of the stator assembly 40 holds the stator 42 stationary. Rotation of the impeller 24 forces fluid to move between the impeller 24, the turbine 26, and the stator 42. The fluid exerts a hydrodynamic torque on the turbine 28. The stator 42 provides a reaction force such that the torque on the turbine 28 can be greater than the torque on the impeller 24. When the speed of the turbine 28 approaches that of the impeller 24, fluid tends to flow around the centerline of the torque converter causing the one-way clutch 44 to overrun.

The one-way clutch 44 is disposed within the hub 46 of the stator 42. The clutch 44 may include an inner race 48 that is connected, e.g. splined, to the stator shaft and a clutch mechanism 50 that selectively locks the hub 46 to the inner race 48 in one direction. An annular side plate 52 axially retains the clutch 44 within the hub 46 and provides an abutment for axial displacement. The stator assembly 40 is axially retained by a pair of thrust bearings 54 and 56.

The annular plate 52 is both axially and rotationally fixed to the stator 42. One attachment method is to form tabs on the side plate that are received in receptacles formed in the hub of the stator. The receptacles create weakened areas due to material removal. Stators of this design are prone to cracking at the receptacles in higher torque applications. The following figures and associated text describe attachments between the annular plate 52 and the stator 42 that do not weaken the stator 42 to reduce likelihood of failure in higher torque applications.

Figure 2:
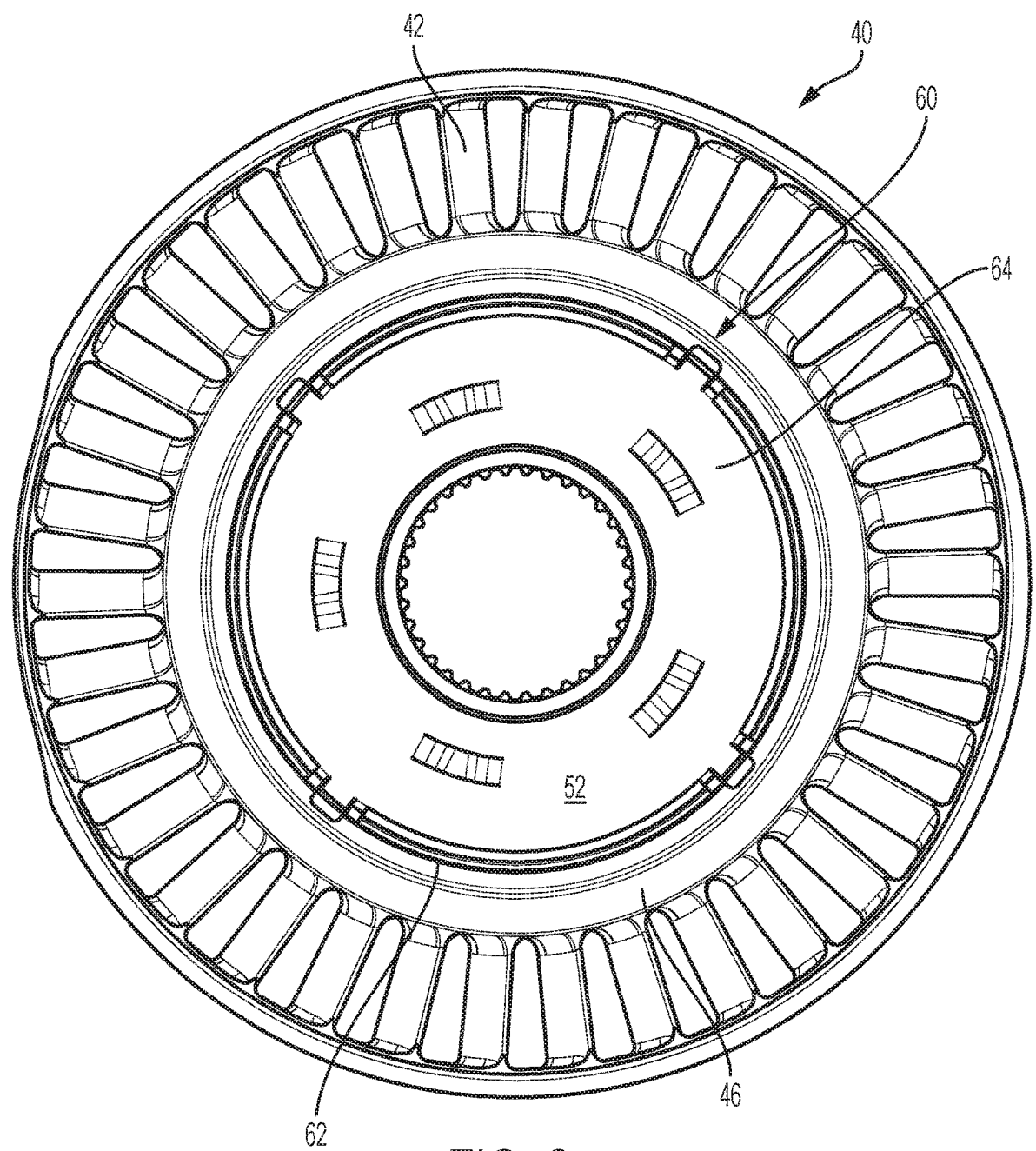
FIG. 2 is an axial front view of a stator assembly of the torque converter.
Figure 3:
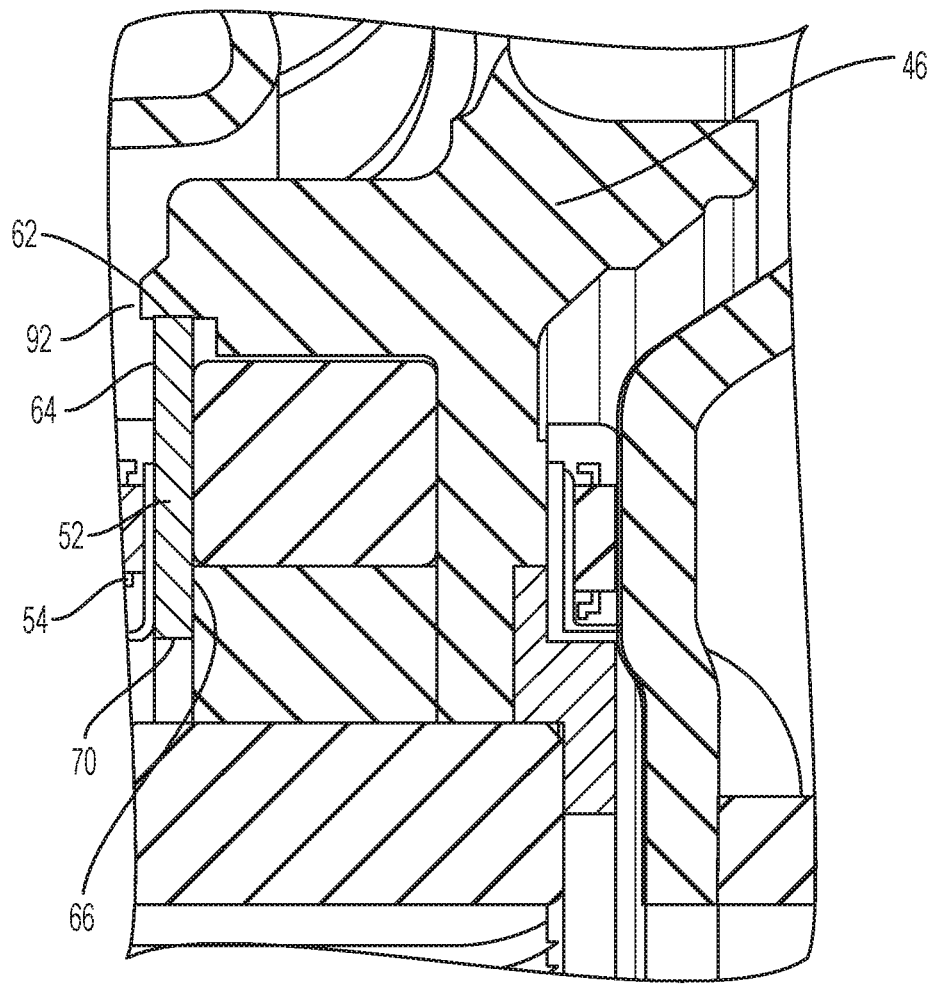
FIG. 3 is a magnified view of FIG. 1 at area 3-3.
Figure 4:
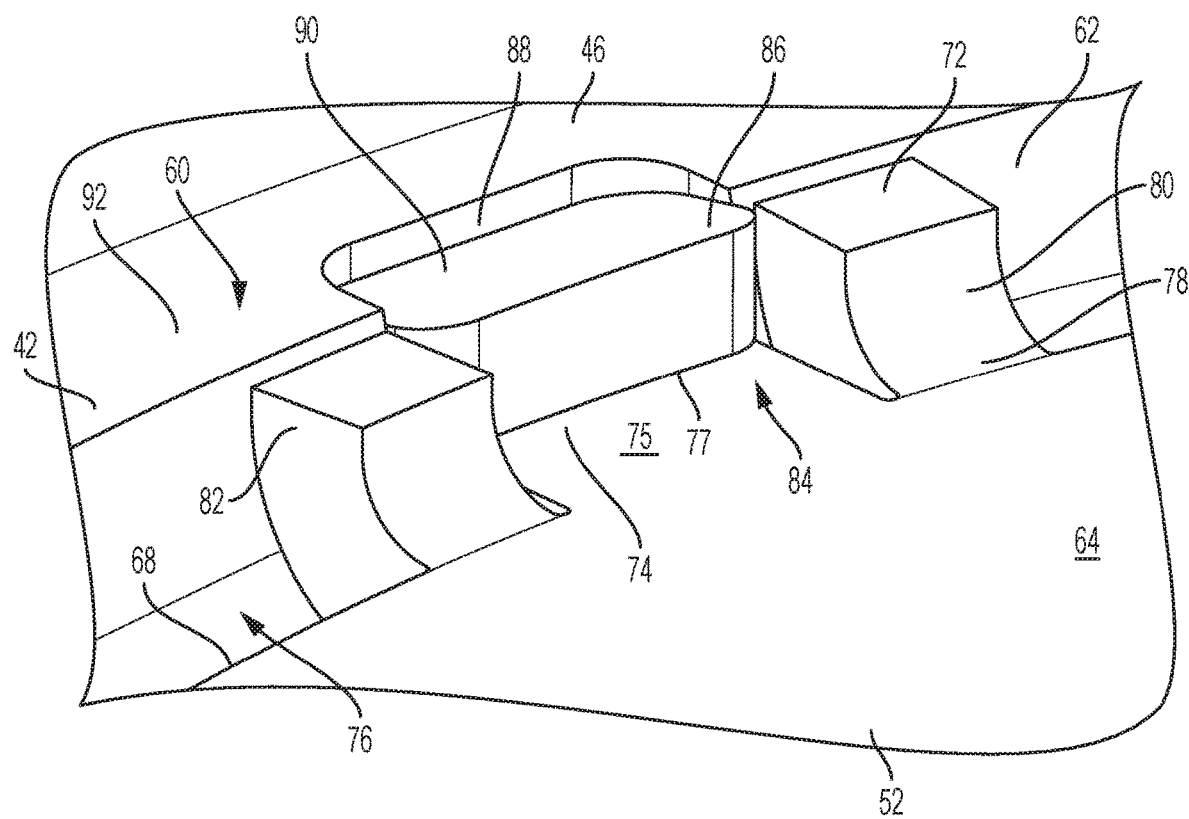
FIG. 4 is a perspective view of an attachment area that secures a side plate to the stator assembly.

Referring to FIGS. 2, 3, and 4, the side plate 52 includes four attachment portions 60 in the illustrated embodiment. More or less attachment portions 60 may be used in other embodiments. The attachment portions 60 may be evenly spaced as illustrated or may have unequal spacing. Each attachment portion 60 is configured to retain the side plate 52 to the stator 42 both rotationally and axially.

The hub 46 may define an inner ring 62 that receives the side plate 52. The side plate 52 may include opposing faces 64, 66, an outer surface 68, and an inner surface 70 that defines a central hole. The plate 52 is attached to the stator 42 with the face 64 engaging the thrust bearing 54 and with the face 66 covering the clutch 44.

The side plate 52 includes features at the attachment portion 60 configured to engage with the inner ring 62 to retain the plate 52 to the stator 42. In one embodiment, the side plate 52 includes a pair of spaced apart anti-rotation tabs 72 and a radially extending tab 74 disposed between the anti-rotation tabs 72. The radially extending tab 74 extends from the outer surface 68 and may be coplanar with the plate 52. The diameter of the outer surface 68 is less than the diameter of the inner ring 62 creating a gap 76 between the inner ring 62 and the outer surface 68. The radially extending tabs 74 are disposed in the gap 76 and may extend to nearly touch the inner ring 62. The anti-rotation tabs 72 are also disposed in the gap 76 but do not project radially outward as far as the radially extending tabs 74. Each anti-rotation tabs 72 may extend from the outer surface 68 and curves upward to includes a radially extending portion 78, a curved portion 80, and an axially extending portion 82. The anti-rotation tabs 72 extend axially past the face 64 to define a receptacle 84 disposed over the radially extending tabs 74. The anti-rotation tabs 72 may be formed by cutting and bending portions of the side plate 52.

The side plate 52 may be attached to the stator 42 by staking. Staking is an operation in which a hammer strikes a metal object causing a portion of the metal to flow and create a projection or tab that can be used to restrain another component. Here, the hub 46 is struck by a hammer at each attachment portion 60 between the pair of anti-rotation tabs 74. This causes a portion of the hub 46 to flow into the receptacle 84 and form projection 86 between the tabs 74. The tabs 72 may guide the flow of material to funnel the material into the receptacle 84. The projection 86 engages with the tabs 72 to prevent rotation between the side plate 52 and the stator 42. The projection 86 is disposed over the radially extending tabs 74 such that faces 75 and 77 of the tab 74 and the projection 86 cooperate to axially restrain the side plate 52 to the stator 42.

The staking operation creates a pocket 88 in the hub 46 where the hammer struck. The pocket 88 is adjacent to the projection 86 and includes a floor 90 that is continuous with the projection 86. The floor 90 may be slanted relative to an end surface 92 of the hub 46. The floor 90 may slant into the hub 46 in an outwardly extending radial direction.

The pockets 88 are shallow and are exaggerated in the illustrations for clarity. In practice, the pockets 88 have a depth of 0.6 to 1.4 millimeters (mm) compared to a depth of 2 to 3 mm for the above-described the receptacles of other designs. Consequently, the pockets 88 remove significantly less material from the hub 46 and do not create weakened areas prone to failure as the receptacles do.

FIGS. 5 through 8 describe another attachment techniques for the annular side plate that also does not create weakened areas in the stator. In this embodiment, the side plate includes teeth that cut into the stator to retain the annular side plate to the stator.

Figure 5:
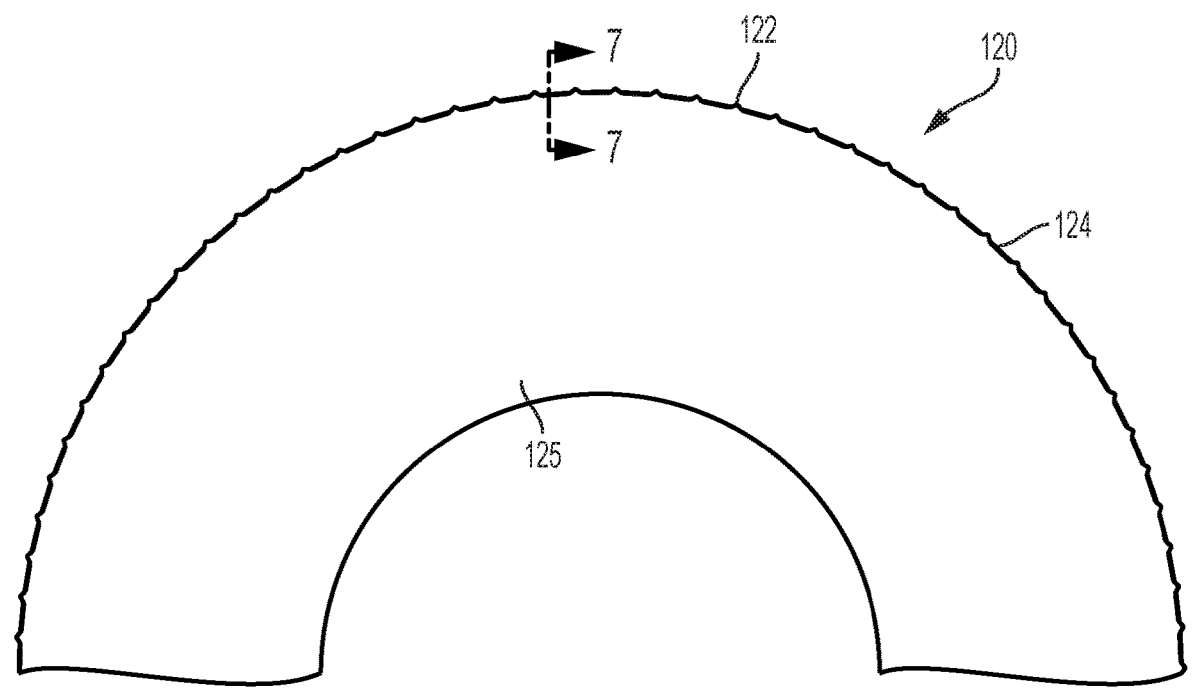
FIG. 5 is another side plate having teeth used to secure the side plate to a stator of another embodiment.
Figure 6:
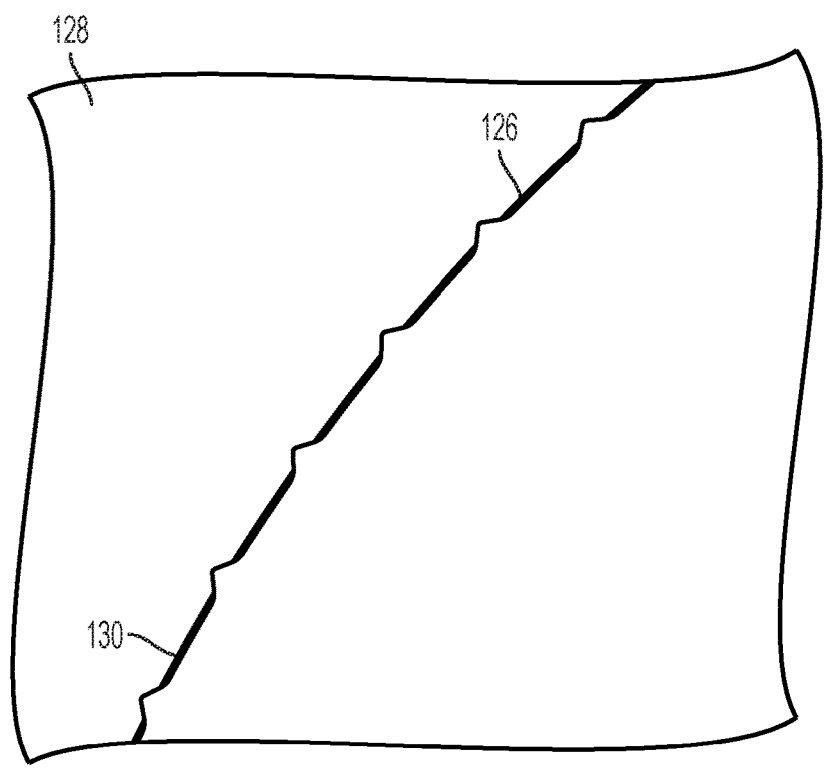
FIG. 6 is an axial front view of the side plate of FIG. 5 installed in the stator.

Referring to FIGS. 5 and 6, a side plate 120 includes a plurality of teeth 122 formed on the outer circumferential surface 124 and projecting outwardly therefrom. The circumferential surface 124 extends between opposing faces 125 of the side plate 120. The teeth 122 may be arranged in the axial direction of the torque converter, which is perpendicular to the rotational direction of the torque converter. Similar to the above-described stator assembly, the side plate 120 is configured to be received within an inner ring 126 of a stator hub 128 to cover the one-way clutch and provide an axial thrust surface. The inner ring 126 defines an inner circumferential surface 130 configured to engage with the teeth 122. A diameter of the circumferential surface 130 is sized so that the teeth 122 cut into the inner ring 126. The diameter of the circumferential surface 130 may also be sized to be equal to, larger than, or smaller than the diameter of the outer circumferential surface 124 (measured at the root of the teeth). In some embodiments, the diameter of the circumferential surface 130 is smaller than the circumferential surface 124 to create a press fit.

Figure 7:
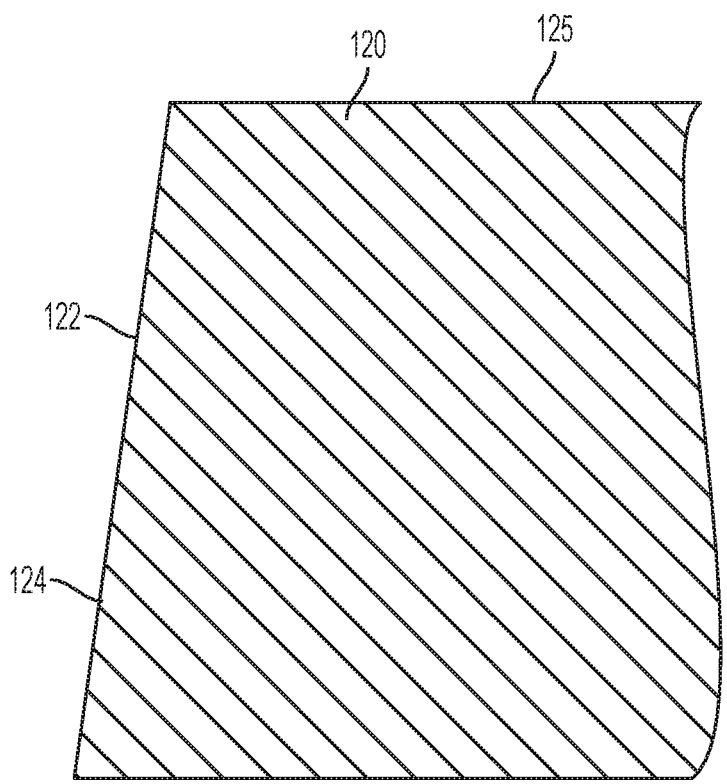
FIG. 7 is a partial cross-sectional view of the side plate at cutline 7-7.

Referring to FIG. 7, the outer circumferential surface 124 may be tapered to facilitate insertion of the side plate 120 into the inner ring 126. The teeth 122 may also be tapered to match the circumferential surface 124. The taper is in the axial direction of the torque converter.

Figure 8:
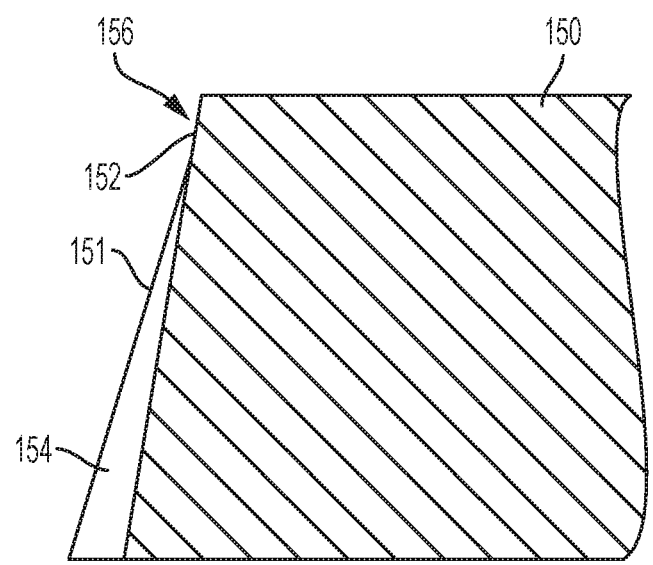
FIG. 8 is a partial cross-sectional view of yet another side plate.

Referring to FIG. 8, in some embodiments, the teeth may only extend partially across the outer circumferential surface. For example, a side plate 150 includes an edge 151 having a circumferential surface 152 and a plurality of teeth 154. The edge 151 of the side plate 150 includes a toothless portion 156 as the teeth 154 extend only partially across the edge 151. The edge 151 may be tapered in some embodiments, in which instance, the teeth 154 may be located on the larger diameter portion of the edge 151.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

20 torque converter
22 case
24 impeller
28 turbine
30 damper flange
31 splines
34 clutch
36 clutch disk
37 piston
38 friction surfaces
39 driven disk
40 stator assembly
42 stator
43 outer ring
44 one-way clutch
45 blades
46 hub
48 inner race
50 mechanism
52 annular plate
54, 56 trust bearings
60 attachment portions
62 inner ring
64, 66 opposing faces
68 outer surface
70 inner surface
72 anti-rotation tab
74 radially extending tab
76 gap
78 radially extending portion
80 curve portion
82 axially extending portion
84 receptacle
86 projection
88 pocket
120 Side plate
122 teeth
124 outer circumferential surface
125 opposing faces
126 inner ring
128 stator hub
130 inner circumferential surface
150 side plate
151 edge
152 circumferential surface
154 teeth

What is claimed is:

1. A stator assembly of a torque converter comprising:
a stator including circumferentially arranged blades, an inner ring, and projections circumferentially arranged around the inner ring and extending radially inward therefrom; and
an annular plate circumscribed by the inner ring and including:
opposing sides oriented radially,
an outer circumferential surface extending between the sides, and
a plurality of attachment portions circumferentially arranged around the outer circumferential surface of the plate, each of the attachment portions having a central tab extending radially outward from the outer circumferential surface and having a pair of spaced anti-rotation tabs flanking the central tab and including portions disposed axially forward of a face of the central tab to define a receptacle over the central tab and between the anti-rotation tabs, wherein each of the attachment portions receives an associated one of the projections in the receptacle with the face of the central tab disposed against a face of the associated projection to prevent relative movement between the stator and the plate.

2. The stator assembly of claim 1, wherein the faces of the central tabs are coplanar with one of the sides.

3. The stator assembly of claim 2, wherein each of the central tabs has a second face that is coplanar with the other of the sides.

4. The stator assembly of claim 1, wherein the portions of the anti-rotation tabs are axially extending portions.

5. The stator assembly of claim 4, wherein the axially extending portions extend axially beyond one of the sides.

6. The stator assembly of claim 5, wherein the anti-rotation tabs each include a radially extending portion and a curved portion connecting the radially extending portion and the axially extending portion.

7. The stator assembly of claim 1, wherein the inner ring includes recessed pockets adjacent to the projections.

8. The stator assembly of claim 7, wherein each of the pockets includes a surface that is continuous with a corresponding one of the projections.

9. The stator assembly of claim 8, wherein the floor surface is angled relative to a face of the stator.

10. The stator assembly of claim 1, further comprising a thrust bearing disposed against one of the sides of the annular plate.

11. The stator assembly of claim 1 further comprising a one-way clutch attached to the stator, wherein the one of the sides is disposed adjacent to the clutch.

12. A method of assembling a stator assembly of a torque converter comprising:
fabricating an annular side plate including a plurality of attachment portions circumferentially arranged around an outer surface of the plate, each of the attachment portions having a pair of spaced anti-rotation tabs;
inserting the plate into a stator, that includes a hub and blades circumferentially arranged around the hub, such that the hub circumscribes the plate; and
staking the stator at each of the attachment portions such that material of the hub flows between the anti-rotation tabs to rotationally fix the stator and the plate.

13. The method of claim 12, wherein the anti-rotation tabs are formed by bending portions of the annular plate such that each of the anti-rotation tabs have a radially extending portion and an axially extending portion that is axially forward of a radial face of the side plate.

14. The method of claim 12, wherein each of the attachment portions further has a central tab radially extending from an outer circumferential surface of the annular side plate, and the material of the hub flows over the central tabs, during the staking, to form a projection that engages with the central tabs to axially fix the stator and the plate.

15. The method of claim 12, wherein the staking further includes striking a radial side of the hub with a hammer to flow the material of the hub between the anti-rotation tabs.

16. A stator assembly of a torque converter comprising:
a stator including an inner ring and circumferentially arranged blades; and
an annular plate including opposing faces, an outer circumferential surface extending between the faces, and teeth formed on the outer surface, wherein the plate is disposed within the inner ring with the teeth penetrating into the inner ring to attach the plate to the stator.

17. The stator assembly of claim 16, wherein an inner diameter of the inner ring is smaller than an outer diameter of the plate.

18. The stator assembly of claim 16, wherein the outer circumferential surface is tapered in an axial direction of the torque converter.

19. The stator assembly of claim 16, wherein the teeth partially extend across the outer surface.

20. The stator assembly of claim 16 further comprising a one-way clutch disposed within the stator, wherein the plate is adjacent to the one-way clutch.

* * * * *